Sept. 8, 1953

E. KARIG 2,651,208

PULLEY FOR VARIABLE SPEED TRANSMISSIONS

Filed Sept. 29, 1950

Inventor:
Erhardt Karig
by
Eugene de Purdy
Attorney

Sept. 8, 1953
E. KARIG
2,651,208
PULLEY FOR VARIABLE SPEED TRANSMISSIONS
Filed Sept. 29, 1950
2 Sheets-Sheet 2
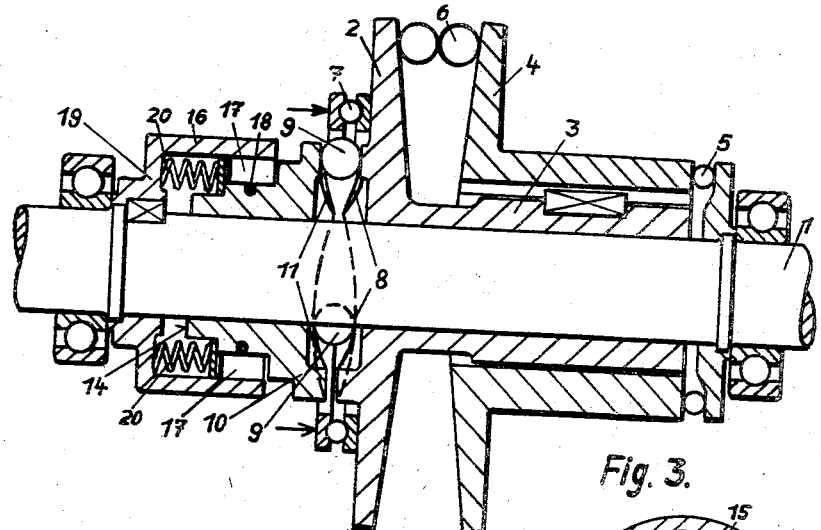
Fig. 3.
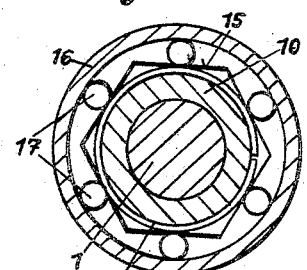
Fig. 5.
Fig. 4.
Inventor:
Erhardt Karig
by
Eugene F. Purdy
Attorney Patented Sept. 8, 1953

2,651,208

UNITED STATES PATENT OFFICE 2,651,208

PULLEY FOR VARIABLE SPEED TRANSMISSIONS

Erhardt Karig, Bad Homburg vor der Hohe, Germany, assignor to Patentverwertung W. Reimers, G. m. b. H., Bad Homburg vor der Hohe, Germany Application September 29, 1950, Serial No. 187,646
In Switzerland October 6, 1949

5 Claims. (Cl. 74—230.17)

In transmissions in which power is transmitted between a V-type pulley and a chain or belt, it is essential that the frictional pressure between the chain and the pulley shall increase in accordance with an increase in the power to be transmitted in order to avoid slipping for different loads and for different transmission adjustments. This condition may be fulfilled by providing torque-responsive means acting to press the chain against the pulley, such means taking the form of a yieldable driving connection between the pulley and the driving shaft upon which the pulley is rotatably mounted. The driving connection may comprise cooperating cam surfaces between the pulley and a sleeve axially slidable upon the driving shaft with resilient means normally pressing the cam surfaces together in coupling engagement but allowing the pulley to yield angularly as a result of sudden overloads imposed upon the transmission.

Such a construction, while advantageous, is subject to the objection that the cam surfaces may move angularly relative to each other comparatively freely after a torque sufficient to initiate release between the cam surfaces has been imparted to the pulley, thus resulting in heavy and damaging shocks to the transmission. For overcoming this disadvantage, the invention contemplates the provision of braking means whereby the shocks incident to starting up or abruptly changing the torque of the pulley and which tend to cause slippage between the chain and the pulley, are prevented. With this object in view, according to the invention the sleeve is made axially slidable and there is provided between the sleeve and its axial abutment a braking device which becomes effective on the occurrence of movements of the sleeve in the direction towards the abutment. The arrangement may be considerably simplified through the braking device being so constructed that it will at the same time act as a pressure-applying spring for the sleeve. Such an arrangement may be formed, for instance, by ring-shaped springs.

According to another possible constructional form the external surface of the sleeve is given the shape of a polyhedron which is embraced by a round socket mounted on the shaft so as not to slide and rotate thereon, axially directed rollers being inserted between the polyhedron and the round socket, which on the sleeve and the round socket turning with respect to one another, by a wedging action couple the two parts together for rotation and axial displacement. For ensuring wedging without a time lag, it is preferable to provide means having a spring action for pressing the rollers against the inner surface of the round socket. Particularly suitable for this purpose has proved to be a spring ring sunk in the sleeve faces.

Two constructional forms of the arrangement according to the invention are illustrated in the accompanying drawings, in which:

Figure 3 is a longitudinal cross-sectional view through a pulley of another constructional form, showing the position of the parts when the transmission is operating free of load;

Figure 4 is a cross-sectional view similar to Fig. 3 showing position of the parts when the transmission is operating under load; and Figure 5 is a transverse cross-sectional view of the pulley of Figs. 3 and 4, showing the braking device therefor.

Figure 1:
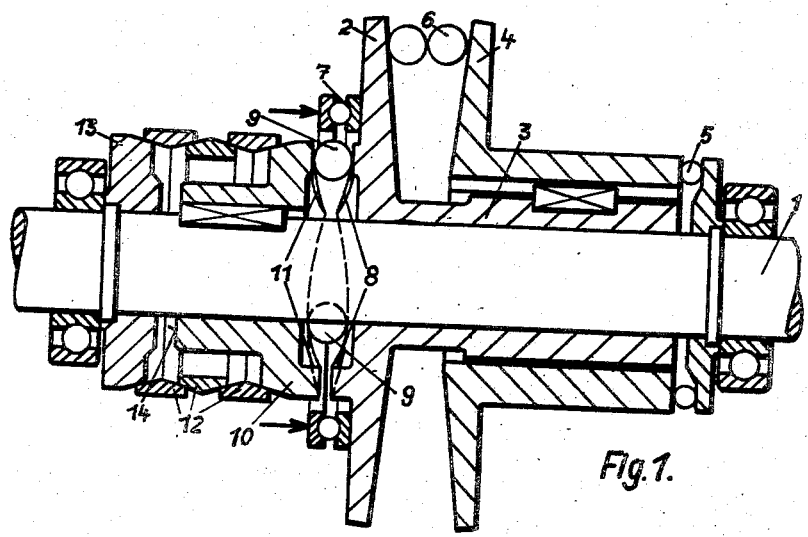
Figure 1 is a longitudinal cross-sectional view through a pulley of the V-type, showing the position of the parts when the transmission is operating free of load.
Figure 2:
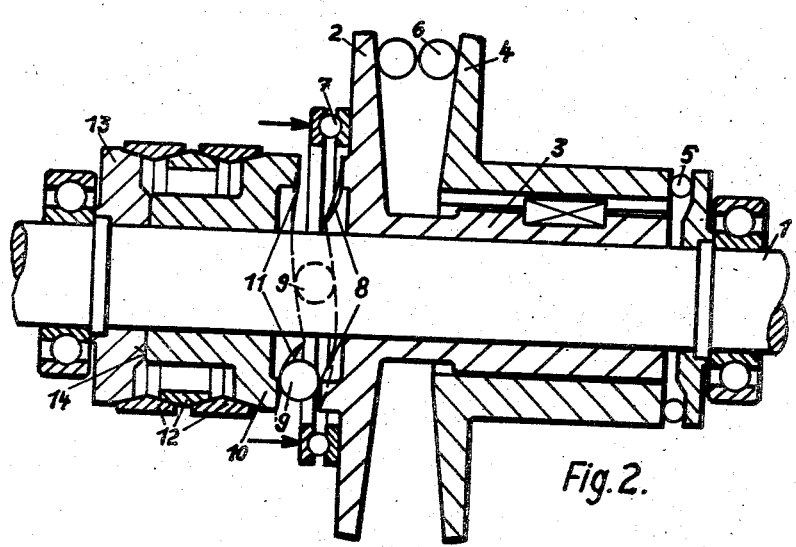
Figure 2 is a cross-sectional view similar to Fig. 1 showing the position of the parts when the transmission is operating under load.

In Figures 1 and 2 a shaft 1 running in ball bearings of a variable speed transmission is shown, on which a conical disc 2 is supported so as to be axially slidable and rotatable thereon. The hub 3 of the conical disc 2 supports a conical disc 4 which is fixed against rotation on hub 3 but is rotatable with the hub on shaft 1. Disc 4 bears with a ball bearing 5 against a collar of the shaft 1. Between the two conical discs runs a transmission chain 6, against which the conical discs are pressed. For regulating the output speed of revolution of the transmission the conical disc 2 is displaced axially relatively to the conical disc 4 by means of a regulating device (such as a lever or threaded spindle, not shown) by way of a ball bearing 7 and thereby the running circle diameter of the transmission chain 6 varied. For transmitting the torque of the shaft 1 to the conical discs, the conical disc 2 is provided with cam surfaces 8, against which rolling bodies 9 bear. On the opposite side these bodies bear against cam surfaces 11 provided on the end of a sleeve 10. The sleeve 10 is supported on the shaft 1 so as to be non-rotatable, but axially slidable thereon and is held by ring springs 12 which are disposed between the sleeve and an end disc 13 fixed on the shaft 1.

When the pulley comprising the conical discs 2 and 4 is running under no load, then, as shown in Figure 1 the sleeve 10 is pushed by the pressure of the ring springs 12 as far towards the conical disc 2 as the rolling bodies 9 and the cam surfaces 8 and 11 will permit, the rolling bodies lying in the deepest places of the cam surfaces.

On the pulley becoming loaded, the torque will exert by way of the cam surfaces an axial thrust on the sleeve 10, by which the sleeve 10 will be forced into its extreme left-hand position, in which its end surface 14 bears against the end disc 13 (Figure 2), the rolling bodies 9 rolling out of the deepest places of the cam surfaces 8 and 11 into their operative position corresponding to the obtaining transmission ratio.

This change-over of the sleeve 10 out of the right-hand into the left-hand extreme position is braked and softened by the ring springs 12, so that it takes place gradually and without shock. The ring springs 12 are under strong mutual friction which enables them to absorb considerable power. Conversely, on account of this friction they can, on the cessation of the torque and the axial force acting on the sleeve 10, expand only slowly and give off only a weak force which moves the sleeve only gradually towards the conical disc 2. At the same time, the closed connection between the movable parts is always maintained, so that no shocks can occur.

In the second constructional form of the pulley according to Figures 3 to 5, the reference numerals 1 to 11 stand for the same parts as in the first constructional form according to Figures 1 and 2. In this case the sleeve 10 has its outer periphery formed as a polyhedron 15 which is encircled by a round socket 16 fixed on the shaft 1 so as to be neither axially nor rotatably displaceable. Between the faces of the polyhedron 15 and the round socket 16 are interposed axially directed rollers 17 which are forced by a spring ring 18 sunk in the cases of the sleeve radially outwards against the internal surface of the round socket 16. Between the sleeve 10 and the end disc 19 of the round socket 16 compression springs 20 are arranged in such a manner that the end surface 14 of the sleeve 10 can bear against the end disc 19.

On the shaft 1 and with it the round socket 16 fixed on it turning with respect to the sleeve 10 which is rotatable and axially displaceable on the shaft, the rollers 17 will become wedged between the round socket 16 and the faces 15 of the sleeve 10 and transmit in this manner the torque from the shaft 1 to the sleeve 10, from where it will act as an axial thrust by way of the rolling bodies 9 on the conical discs 2 and 4. This axial thrust seeks to force the sleeve 10 into its extreme position (Figure 4). This motion is opposed by the friction of the rollers 17 at the faces 15 and the internal surface of the round socket 16, so that the motion can only proceed slowly under a great expenditure of force and every shock is absorbed.

On the torque decreasing, the rollers 17 will slacken, the axial pressure will lessen and the springs 20 will force the sleeve 10 in the direction towards the conical disc 2, so that on the pulley coming under load again, the sleeve 10 is ready to absorb shocks.

I claim:
1. The combination with a drive shaft of a V-type pulley rotatably mounted upon said shaft, said pulley comprising a pair of oppositely-disposed conical discs adapted to receive between their inner conical faces a flexible transmission member, an abutment on the shaft, a sleeve axially slidable upon the shaft between the pulley and the abutment, means for driving the sleeve from the shaft, said sleeve and said pulley presenting cooperating cam surfaces for providing a driving connection between the sleeve and the pulley, resilient means urging the sleeve toward the pulley and frictional braking means for the sleeve for retarding motion of the sleeve in a direction opposite to the thrust of the resilient means, the said braking means comprising an annular member encircling the sleeve and mounted upon the shaft independently of the sleeve, and wedge surfaces between the sleeve and the annular member adapted to be urged into frictional contact responsive to the torque transmitted to the sleeve.

2. The combination with a drive shaft of a V-type pulley rotatably mounted upon said shaft, said pulley comprising a pair of oppositely-disposed conical discs adapted to receive between their inner conical faces a flexible transmission member, an abutment on the shaft, a sleeve rotatable and axially slidable upon the shaft between the pulley and the abutment, means for driving the sleeve from the shaft, said driving means comprising an annular socket fixed to the shaft and encircling the sleeve, wedge surfaces upon the circumference of the sleeve, rollers interposed between the socket and the wedge surfaces of the sleeve, cooperating cam surfaces between the sleeve and the pulley for providing a driving connection therebetween, and resilient means urging the sleeve toward the pulley.

3. The combination as set forth in claim 2 including spring means for biasing the rollers radially outward into contact with the socket.

4. The combination as set forth in claim 2 in which the resilient means urging the sleeve toward the pulley are mounted within the socket intermediate an end of the sleeve and an end of the socket.

5. The combination with a drive shaft of a V-type pulley rotatably mounted upon said shaft, said pulley comprising a pair of oppositely disposed conical discs adapted to receive between their inner conical faces a flexible transmission member, an abutment on the shaft, a sleeve axially slidable upon the shaft between the pulley and the abutment, means for driving the sleeve from the shaft, said sleeve and said pulley presenting co-operating cam surfaces for providing a driving connection between the sleeve and the pulley, resilient means urging the sleeve towards the pulley, and frictional braking means for the sleeve for retarding motion of the sleeve in a direction opposite to the thrust of the resilient means, the said resilient means comprising expansible and contractible spring means encircling the sleeve, and co-acting wedge surfaces between the sleeve and the spring means, whereby axial movement of the sleeve relative to the spring means produces a braking action between said wedge surfaces.

ERHARDT KARIG.

References Cited in the file of this patent

UNITED STATES PATENTS

| Number | Name | Date |
|---|---|---|
| 1,515,346 | Kreissig | Nov. 11, 1924 |
| 2,068,784 | Abbott | Jan. 26, 1937 |
| 2,276,186 | Getchell | Mar. 10, 1942 |

FOREIGN PATENTS

| Number | Country | Date |
|---|---|---|
| 225,629 | Switzerland | May 17, 1943 |